(12) United States Patent
Baird

(10) Patent No.: US 11,512,738 B2
(45) Date of Patent: *Nov. 29, 2022

(54) HYBRID METALLIC/COMPOSITE JOINT WITH SEPARATE INTERNAL BEARING

(71) Applicant: GOODRICH CORPORATION, Charlotte, NC (US)

(72) Inventor: Bradley William Baird, Grimsby (CA)

(73) Assignee: GOODRICH CORPORATION, Charlotte, NC (US)

( * ) Notice: Subject to any disclaimer, the term of this patent is extended or adjusted under 35 U.S.C. 154(b) by 902 days.

This patent is subject to a terminal disclaimer.

(21) Appl. No.: 16/381,808

(22) Filed: Apr. 11, 2019

(65) Prior Publication Data

US 2020/0325932 A1 Oct. 15, 2020

(51) Int. Cl.
*F16C 19/38* (2006.01)
*B64C 25/10* (2006.01)
*B64C 25/58* (2006.01)
*B64C 1/00* (2006.01)
(Continued)

(52) U.S. Cl.
CPC .......... *F16C 19/386* (2013.01); *B29C 66/721* (2013.01); *B64C 25/10* (2013.01); *B64C 25/58* (2013.01); *F16C 7/02* (2013.01); *B64C 2001/0072* (2013.01); *B64C 2001/0081* (2013.01)

(58) Field of Classification Search
CPC ........ F16C 19/386; F16C 7/02; B29C 66/721; B64C 25/10; B64C 25/58; B64C 2001/0072; B64C 2001/0081
See application file for complete search history.

(56) References Cited

U.S. PATENT DOCUMENTS

| 1,003,530 A | 9/1911 | Smith |
| 3,638,979 A | 2/1972 | Francois |
| 4,127,344 A | 11/1978 | Kwiatkowski |

(Continued)

FOREIGN PATENT DOCUMENTS

| CN | 107044572 | 8/2017 |
| CN | 107687558 | 2/2018 |

(Continued)

OTHER PUBLICATIONS

European Patent Office, European Search Report dated Aug. 4, 2020 in Application No. 19215266.8.

(Continued)

*Primary Examiner* — Rodney A Bonnette
(74) *Attorney, Agent, or Firm* — Snell & Wilmer L.L.P.

(57) ABSTRACT

A metallic-composite joint fitting is provided. The fitting may comprise a frustoconical internal bearing having a bore, a conical sleeve configured to be disposed about the frustoconical internal bearing, a composite structure configured to couple between the frustoconical internal bearing and the conical sleeve, a metallic end fitting configured to be disposed within the bore and couple to the frustoconical internal bearing, and an external nut configured to couple to the metallic end fitting and the conical sleeve, wherein at least one of the frustoconical internal bearing or the conical sleeve comprises a flanged portion mutually configured to couple the conical sleeve to the frustoconical internal bearing via a locking ring.

20 Claims, 4 Drawing Sheets

(51) Int. Cl.
B29C 65/00 (2006.01)
F16C 7/02 (2006.01)

(56) References Cited

U.S. PATENT DOCUMENTS

| | | | |
|---|---|---|---|
| 4,353,268 A | 10/1982 | Picard |
| 4,373,832 A | 2/1983 | Monteillet |
| 4,411,114 A | 10/1983 | Wurtinger |
| 4,469,730 A | 9/1984 | Burhans |
| 4,647,078 A | 3/1987 | Lundy |
| 4,848,957 A | 7/1989 | Umeda |
| 5,303,958 A | 4/1994 | Hyatt et al. |
| 5,318,374 A | 6/1994 | Rumberger |
| 6,734,805 B2 | 5/2004 | Johnson |
| 8,205,315 B2 | 6/2012 | Mullen et al. |
| 8,262,825 B2 | 9/2012 | Fahey et al. |
| 9,366,277 B2 | 6/2016 | Ingles et al. |
| 9,482,266 B2 | 11/2016 | Dewhirst |
| 9,568,040 B2 | 2/2017 | Ganis |
| 9,689,514 B2 | 6/2017 | Leslie et al. |
| 9,726,325 B2 | 8/2017 | Ganis et al. |
| 9,810,353 B2 | 11/2017 | Leslie et al. |
| 9,873,506 B2 | 1/2018 | Goldring et al. |
| 10,190,607 B2 | 1/2019 | Goldring et al. |
| 10,626,917 B1 * | 4/2020 | Baird .................... B29C 66/721 |
| 2015/0035276 A1 | 2/2015 | Shmelev et al. |
| 2016/0272304 A1 | 9/2016 | Goldring et al. |
| 2017/0051767 A1 | 2/2017 | Giannakopoulos |
| 2017/0198734 A1 | 7/2017 | Bernard et al. |
| 2018/0283424 A1 | 10/2018 | Beale |

FOREIGN PATENT DOCUMENTS

| | | |
|---|---|---|
| EP | 3076048 | 10/2016 |
| EP | 3156324 | 4/2017 |
| RU | 2154767 | 8/2000 |

OTHER PUBLICATIONS

USPTO, Notice of Allowance dated Jan. 29, 2020 in U.S. Appl. No. 16/381,762.
U.S. Pat. No. 100353 listed above (SB08A form will not allow Patent No. to be properly cited) Pub date Mar. 1, 1870.
European Patent Office, European Search Report dated Jul. 23, 2020 No. 19214611.6.

* cited by examiner

HYBRID METALLIC/COMPOSITE JOINT WITH SEPARATE INTERNAL BEARING

FIELD

The present disclosure relates to composite tube assemblies and methods of manufacture of composite tube assemblies, and, more specifically, to aircraft retractable landing gear systems having metallic component interfaces to composite tubes.

BACKGROUND

Composite tubes are often used due to their high strength and low weight in industries and applications where weight is a significant design factor, such as in the aircraft and automotive industries. Landing gear supports an aircraft while the aircraft is on the ground and tend to comprise metallic components capable of withstanding the high structural loads environment of aircraft landing. Landing gear may include one or more wheels and a shock strut assembly in order to attenuate the forces associated with landing or ground operations. Composite tubes may be used to interface between metallic structures and thereby tend to reduce component weight. The structures may be subjected to axial tensile and compressive loads, shear loads, bending loads, and torsional loads. Working loads may be transmitted directly through to the composite structure which may benefit of a connector having an optimized load path between metallic structures and the composite structure.

SUMMARY

In various embodiments, a metallic-composite joint fitting is provided comprising a frustoconical internal bearing having a bore, a conical sleeve configured to be disposed about the frustoconical internal bearing, a composite structure configured to couple between the frustoconical internal bearing and the conical sleeve, a metallic end fitting configured to be disposed within the bore and couple to the frustoconical internal bearing, and an external nut configured to couple to the metallic end fitting and the conical sleeve, wherein at least one of the frustoconical internal bearing or the conical sleeve comprises a flanged portion mutually configured to couple the conical sleeve to the frustoconical internal bearing via a locking ring.

In various embodiments, the joint fitting further comprises an internal bolt coupled within the bore, wherein the metallic end fitting comprises a bearing portion configured to be disposed within the bore and couple to the internal bolt. In various embodiments, the composite structure comprises a cylindrical portion and a conical end portion. In various embodiments, the conical end portion is coupled relatively between the frustoconical internal bearing at a first conical bearing surface and the conical sleeve at a second conical bearing surface. In various embodiments, the conical end portion is flared. In various embodiments, the bearing portion contacts the frustoconical internal bearing at a cylindrical bearing surface. In various embodiments, the internal bolt is integral to the frustoconical internal bearing. In various embodiments, the metallic end fitting is coupled to the internal bolt at an internally threaded surface of the metallic end fitting. In various embodiments, the external nut is contacted with the conical sleeve via an end washer. In various embodiments, the conical sleeve comprises the flanged portion coupled to the frustoconical internal bearing via the locking ring.

In various embodiments, a landing gear system is provided comprising a shock strut coupled to an axle, a wheel coupled to the axle, and a metallic-composite joint fitting comprising a frustoconical internal bearing, an internal bolt coupled within a bore of the frustoconical internal bearing, a metallic end fitting coupled to the internal bolt, wherein the metallic end fitting comprises a bearing portion disposed within the bore, a conical sleeve disposed about the frustoconical internal bearing, and an external nut coupled to the metallic end fitting and the conical sleeve, wherein the conical sleeve comprises a flanged portion coupled to the frustoconical internal bearing.

In various embodiments, a composite structure is coupled between the frustoconical internal bearing and the conical sleeve. In various embodiments, the composite structure comprises a cylindrical portion and a conical end portion. In various embodiments, the conical end portion is coupled relatively between the frustoconical internal bearing at a first conical bearing surface and the conical sleeve at a second conical bearing surface. In various embodiments, the conical end portion is flared. In various embodiments, the bearing portion contacts the frustoconical internal bearing at a cylindrical bearing surface. In various embodiments, the internal bolt is integral to the frustoconical internal bearing. In various embodiments, the metallic end fitting is coupled to the internal bolt at an internally threaded surface of the metallic end fitting. In various embodiments, the flanged portion of the conical sleeve is coupled to the frustoconical internal bearing via a locking ring.

In various embodiments, a method of joining a composite structure and a metallic end fitting comprises coupling an internal bolt within a bore of a frustoconical internal bearing, wrapping the composite structure over the frustoconical internal bearing to form a conical end portion, disposing a conical sleeve over the conical end portion to enclose the conical end portion between a first conical bearing surface and a second conical bearing surface, inserting a bearing portion of the metallic end fitting into the bore of the frustoconical internal bearing and coupling the internal bolt to an internally threaded surface of the metallic end fitting, and coupling an external nut to an externally threaded surface of the metallic end fitting and contacting the external nut with the conical sleeve.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1:
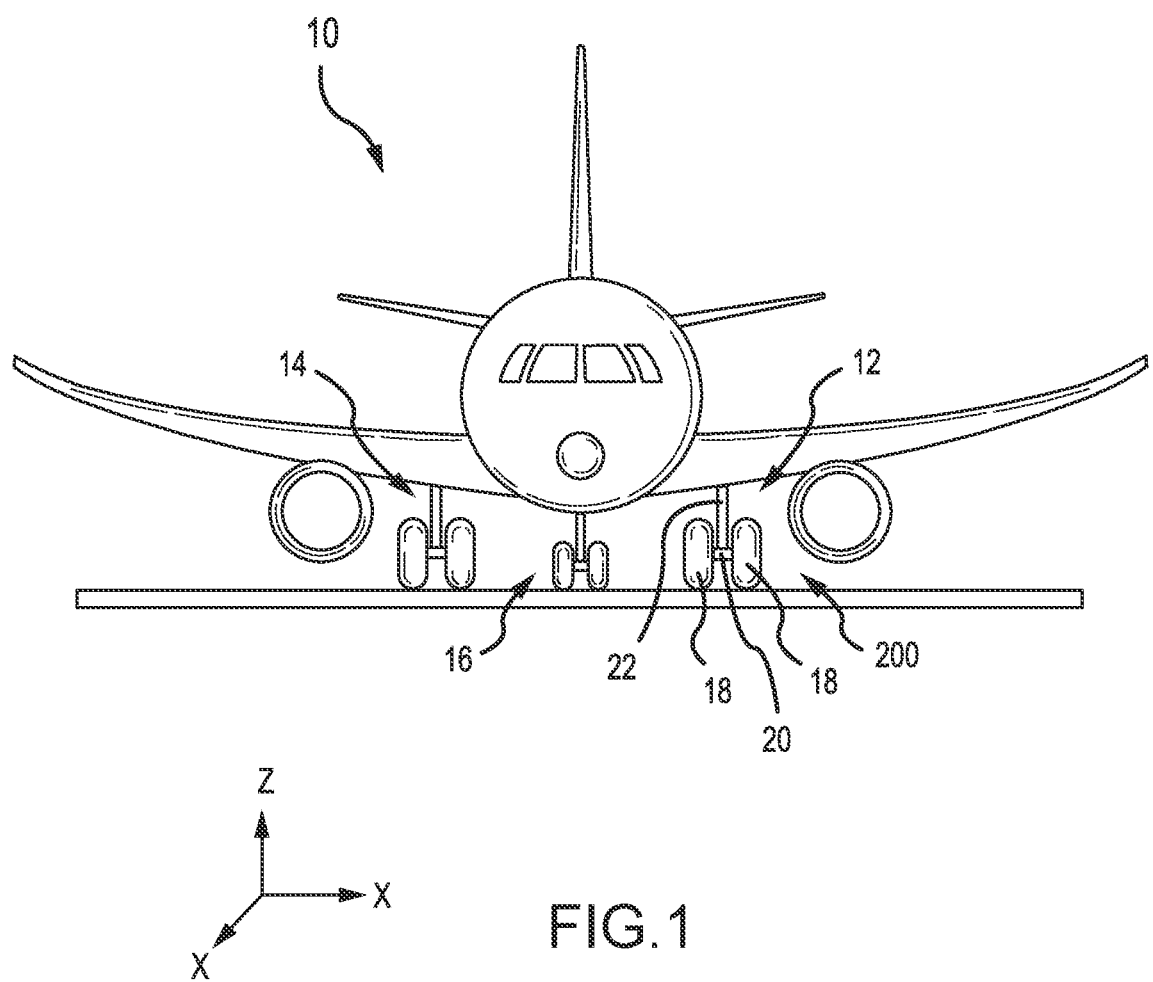
FIG. 1 illustrates an aircraft, in accordance with various embodiments.

With reference to FIG. 1, an aircraft 10 in accordance with various embodiments may comprise aircraft systems, for example, one or more landing gear such as landing gear 12, landing gear 14 and landing gear 16. Landing gear 12, landing gear 14 and landing gear 16 may generally support aircraft 10 when aircraft 10 is not flying, allowing aircraft 10 to taxi, take off, and land without damage and may comprise wheels and an oleo strut, also referred to as a shock strut, comprising a strut cylinder and a strut piston filled with a hydraulic fluid. For example, landing gear 12 may include wheels 18 coupled by an axle 20 and a shock strut assembly 22 comprising a metallic-composite joint fitting 200.

Figure 2:
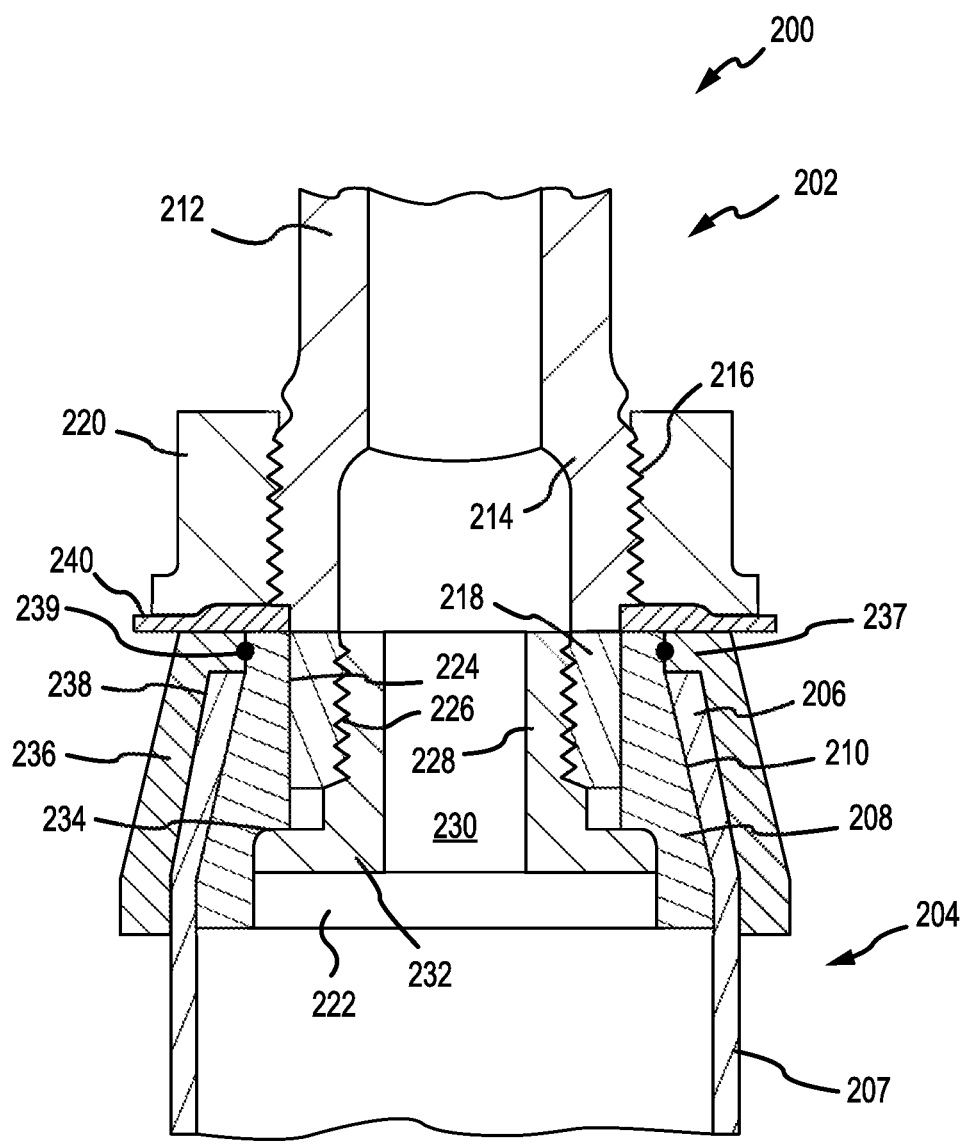
FIG. 2 illustrates a metallic-composite joint fitting, in accordance with various embodiments.

In various embodiments and with additional reference to FIG. 2, metallic-composite joint fitting 200 (hereinafter "fitting") is illustrated in planar cross section of the XY-plane. Fitting 200 comprises a coupling between a metallic end fitting 202 and a composite structure 204. Composite structure 204 comprises a conical end portion 206 wrapped about a frustoconical internal bearing 208. In this regard, the conical end portion 206 may engage with the frustoconical internal bearing 208 along a first conical bearing surface 210. In various embodiments, the conical end portion 206 of the composite structure 204 may flare outward from the first conical bearing surface 210. Stated another way, the conical end portion 206 may increase in radial (i.e., X-axis) thickness, as compared to the radial thickness of a cylindrical portion 207 of the composite structure 204, progressing along the Y-axis from the cylindrical portion 207 toward the tip of the conical end portion 206.

In various embodiments, the metallic end fitting 202 may comprise a shaft 212 and a coupling feature 214. The coupling feature 214 includes an externally threaded surface 216 at the outer diameter of the coupling feature 214 configured to engage with an external nut 220. The externally threaded surface 216 extends from the shaft 212 toward a bearing portion 218 relatively below (along the Y-axis) the externally threaded surface 216. The bearing portion 218 is inserted into a bore 222 through the frustoconical internal bearing 208 and engages with a cylindrical bearing surface 224 which defines the inner diameter of the frustoconical internal bearing 208. The coupling feature 214 includes an internally threaded surface 226 at the inner diameter of the coupling feature 214. In various embodiments, the internally threaded surface 226 may extend along the inner diameter of the coupling feature 214 radially inward of the bearing portion 218. The internally threaded surface 226 may be configured to engage with a shank 228 of an internal bolt 230.

Internal bolt 230 may extend into bore 222 of the frustoconical internal bearing 208. In various embodiments, the head 232 of internal bolt 230 may seat against a shoulder 234 within the bore 222 and thereby tend to inhibit the metallic end fitting 202 from translating axially outward (along the Y-axis) with respect to the frustoconical internal bearing 208 and maintain the engagement of the bearing portion 218 along the cylindrical bearing surface 224. In various embodiments, the head 232 of internal bolt 230 may be configured to inhibit rotation of the internal bolt with respect to the frustoconical internal bearing 208. For example, head 232 may be relatively D-shaped and the bore 222 may include a relatively flat portion configured to interface with a flat portion of the D-shaped head tending thereby to inhibit rotation of the internal bolt 230 with respect to the frustoconical internal bearing 208. In various embodiments, an internal bolt may be integral to a frustoconical internal bearing or may be fixedly coupled to a frustoconical internal bearing such as, for example, by welding or bonding.

In various embodiments, a conical sleeve 236 may be disposed about the frustoconical internal bearing 208 over the conical end portion 206 of the composite structure 204. Conical sleeve 236 comprises a flanged portion 237 in contact with the conical end portion 206. The conical sleeve 236 may lie radially outward of the conical end portion 206 and the frustoconical internal bearing 208 may lie radially inward of the conical end portion 206 and the conical sleeve 236. In this regard, the conical end portion 206 may be sandwiched between the frustoconical internal bearing 208 at first conical bearing surface 210 and the conical sleeve 236 at a second conical bearing surface 238. In various embodiments, external nut 220 may be contacted with the conical sleeve 236, the conical end portion 206, and the frustoconical internal bearing 208 via an end washer 240. In various embodiments, the flanged portion 237 may be configured to interface between the external nut 220 and/or the end washer 240 and the conical end portion 206.

In this regard, the external nut 220 tends to inhibit the metallic end fitting 202 from translating axially inward (along the Y-axis) with respect to the frustoconical internal bearing 208 by generating an interference at the second conical bearing surface 238 between the conical sleeve 236 and the conical end portion 206. In various embodiments, the conical sleeve may be coupled to the frustoconical internal bearing 208 such as by a locking ring 239. In this regard, the frustoconical internal bearing 208 and the conical sleeve 236 may tend to behave as a monolithic structure when distributing loads such as, for example, bending loads. Stated another way, the locking ring 239 and flanged portion 237 may tend to inhibit relative motion between the internal bearing 208 and the conical sleeve 236 in response to bending loads. In various embodiments, the locking ring 239 may be integral with the internal bearing 208. In various embodiments, the conical sleeve 208 may comprise two or more sections fitted about the locking ring 239 and coupled to the conical end portion 206 such as, for example, by a clamp band or by welding between the sections.

Figure 3:
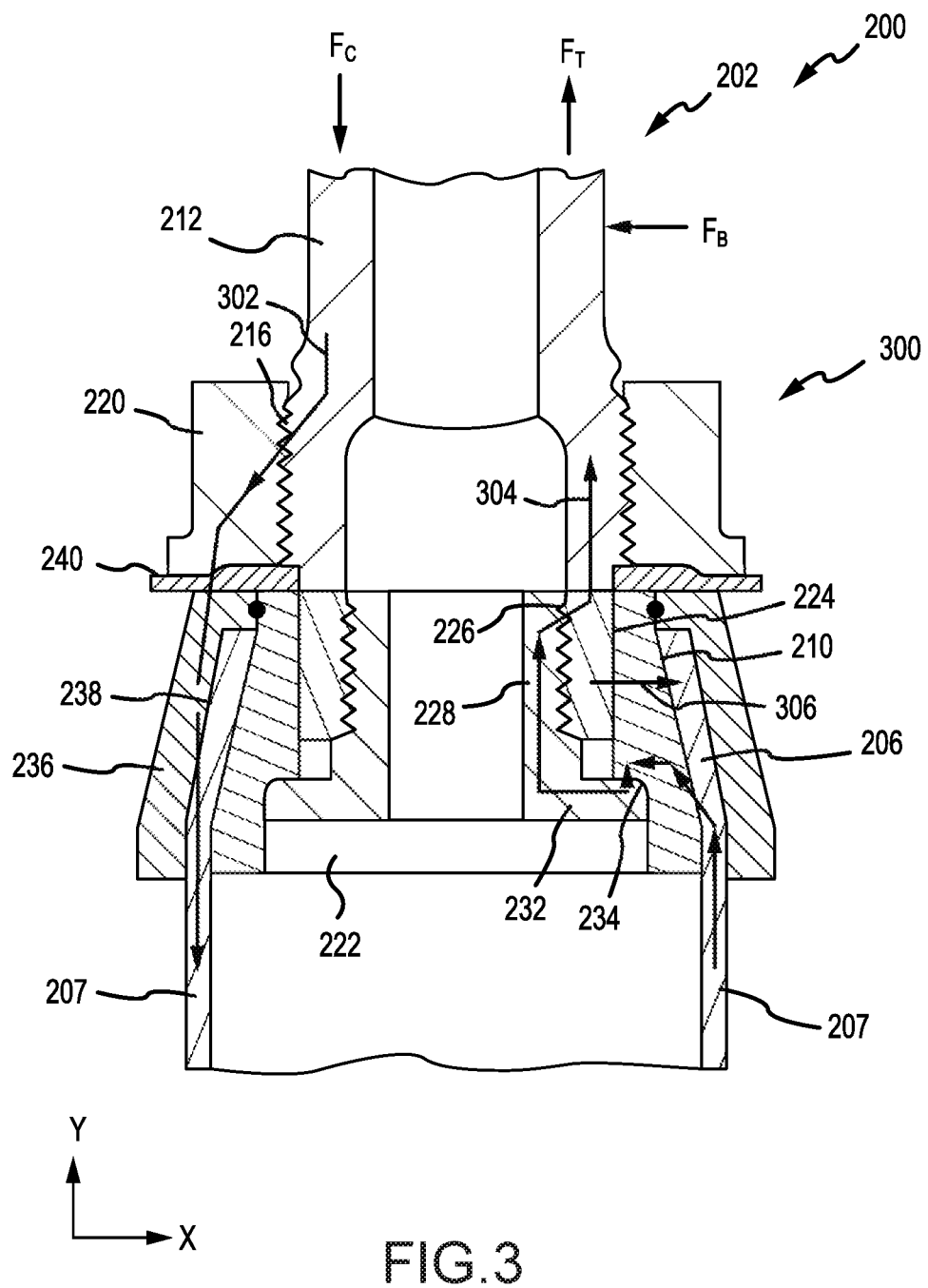
FIG. 3 illustrates load paths in a metallic-composite joint fitting, in accordance with various embodiments.
Figure 4:
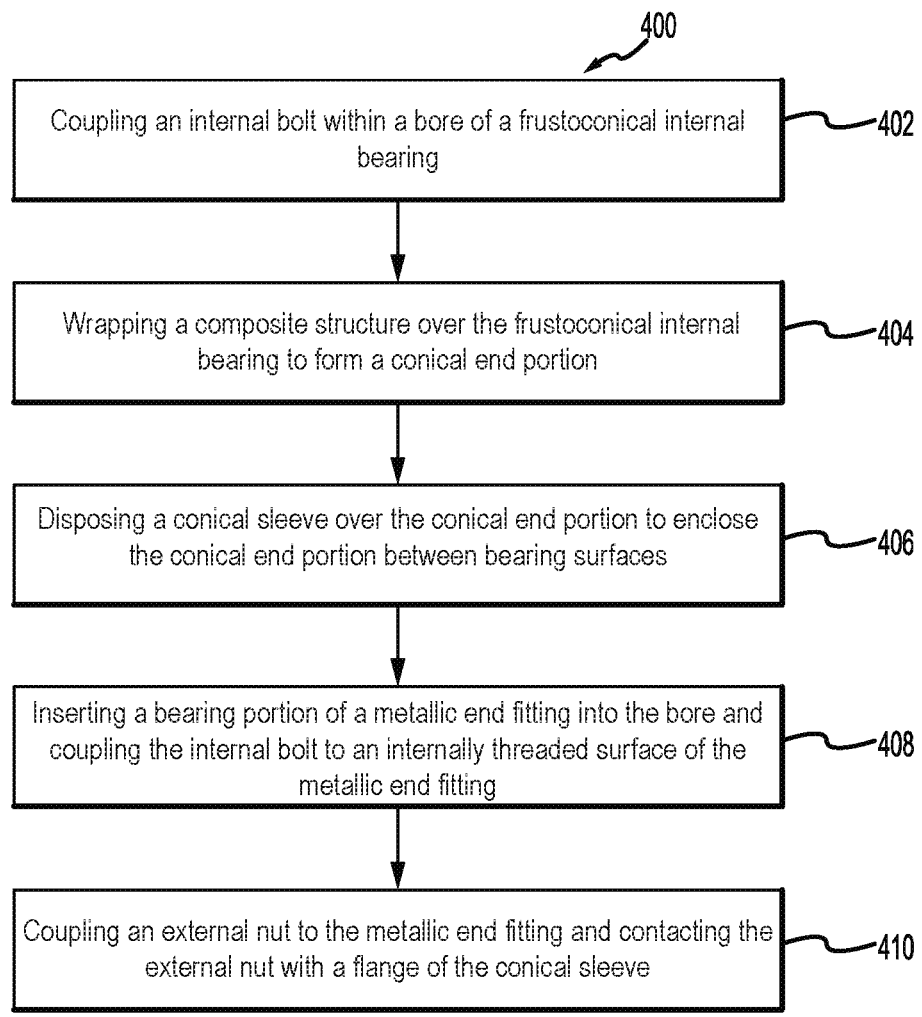
FIG. 4 illustrates a method of joining a composite structure and a metallic end fitting, in accordance with various embodiments.

In various embodiments and with additional reference to FIG. 3, fitting 200 may be optimized to carry compressive and tension loads via threaded surfaces while carrying bending loads at non-threaded bearing surfaces. In this regard, fitting 200 may tend to benefit of improved bending load performance. Fitting 200 is illustrated in cross section overlaid with optimized load paths 300 for axial tension, axial compression, and radial bending loads applied at metallic end fitting 202. A compressive force $F_C$ applied at the metallic end fitting 202 travels as shown by arrows 302 through externally threaded surface 216 into external nut 220. External nut 220 transmits $F_C$ through end washer 240 into conical sleeve 236. The conical sleeve 236 transmits the compressive force $F_C$ through the second conical bearing surface 238 into the conical end portion 206 and thereby the cylindrical portion 207 of composite structure 204. As shown by arrows 304, a tension force FT applied at the metallic end fitting 202 is transmitted via internally threaded surface 226 into shank 228 of internal bolt 230. Internal bolt 230 transmits the tension force FT through shoulder 234 into frustoconical internal bearing 208. The frustoconical internal bearing 208 passes the tension force FT through the first conical bearing surface 210 into the conical end portion 206 and thereby the cylindrical portion 207 of composite structure 204.

A bending load $F_B$ is applied at the metallic end fitting 202 and travels as shown by arrow 306 entirely (i.e., greater than 95% of the bending load) through cylindrical bearing surface 224 into the frustoconical internal bearing 208. The frustoconical internal bearing 208 passes the bending load through locking ring 239 and flanged portion 237 and through the first conical bearing surface 210 into the conical end portion 206. Head 232 of internal bolt 230 may have relatively reduced diameter in comparison to the diameter of the bore 222 and thereby engage primarily axially (along the Y-axis) the frustoconical internal bearing 208 at the shoulder 234. In this regard, radial contact (along the X-axis) between the frustoconical internal bearing 208 and the head 232 under a bearing load may be minimized or eliminated. The fitting 200 may thereby tend to inhibit bearing loads from passing through any of the threaded surfaces (226, 216). In response to bending load $F_B$ applied at the metallic end fitting 202 shear loads (along the Y-axis) may be induced at the locking ring 239 which are transferred into the flanged portion 237 of conical sleeve 236 and into the frustoconical internal bearing 208. In this regard, the shear load behavior of the locking ring 239 in response to the bending load $F_B$ tends to impart the monolithic behavior of the conical sleeve 236 and the frustoconical internal bearing 208 in bending by restriction of relative motion (generating the shear loads) between the conical sleeve 236 and the frustoconical internal bearing 208. Stated another way, the monolithic behavior induced by the locking ring 239 squeezes the conical end portion 206 between the conical sleeve 236 and the frustoconical internal bearing 208 in response to the bending load $F_B$.

In various embodiments, a method 400 of joining a composite structure 204 and a metallic end fitting 202 may comprise coupling an internal bolt 230 within a bore 222 of a frustoconical internal bearing 208 (step 402). Method 400 includes wrapping the composite structure 204 over the frustoconical internal bearing 208 to form a conical end portion 206 (step 404). Method 400 includes disposing a conical sleeve 236 over the conical end portion 206 to enclose the conical end portion 206 between a first conical bearing surface 210 and a second conical bearing surface 238 (step 406). Step 406 includes coupling a flanged portion 237 of the conical sleeve 236 to the frustoconical internal bearing 208 via a locking ring 239. Method 400 includes inserting a bearing portion of the metallic end fitting 202 into the bore of the frustoconical internal bearing 208 and coupling the internal bolt 230 to an internally threaded surface 226 of the metallic end fitting 202 (step 408). Method 400 includes coupling an external nut 220 to an externally threaded surface 216 of the metallic end fitting 202 and contacting the external nut 220 with the flanged portion 237 of the conical sleeve 236 (step 410). In various embodiments, the external nut 220 may be contacted with the flanged portion 237 of conical sleeve 236 via an end washer 240.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A metallic-composite joint fitting, comprising:
a frustoconical internal bearing having a bore;
a conical sleeve configured to be disposed about the frustoconical internal bearing;
a composite structure configured to couple between the frustoconical internal bearing and the conical sleeve;
a metallic end fitting configured to be disposed within the bore and couple to the frustoconical internal bearing, wherein the metallic end fitting comprises a bearing portion configured to be disposed within the bore; and
an external nut configured to couple to the metallic end fitting and the conical sleeve,
wherein at least one of the frustoconical internal bearing or the conical sleeve comprises a flanged portion mutually configured to couple the conical sleeve to the frustoconical internal bearing via a locking ring.

2. The metallic-composite joint fitting of claim 1, further comprising an internal bolt coupled within the bore, wherein the metallic end fitting is coupled to the internal bolt.

3. The metallic-composite joint fitting of claim 2, wherein the composite structure comprises a cylindrical portion and a conical end portion.

4. The metallic-composite joint fitting of claim 3, wherein the conical end portion is coupled relatively between the frustoconical internal bearing at a first conical bearing surface and the conical sleeve at a second conical bearing surface.

5. The metallic-composite joint fitting of claim 4, wherein the conical end portion is flared.

6. The metallic-composite joint fitting of claim 1, wherein the bearing portion contacts the frustoconical internal bearing at a cylindrical bearing surface.

7. The metallic-composite joint fitting of claim 1, wherein the internal bolt is integral to the frustoconical internal bearing.

8. The metallic-composite joint fitting of claim 1, wherein the metallic end fitting is coupled to the internal bolt at an internally threaded surface of the metallic end fitting.

9. The metallic-composite joint fitting of claim 1, wherein the external nut is contacted with the conical sleeve via an end washer.

10. The metallic-composite joint fitting of claim 1, wherein the conical sleeve comprises the flanged portion coupled to the frustoconical internal bearing via the locking ring.

11. A landing gear system, comprising:
a shock strut coupled to an axle;
a wheel coupled to the axle; and
a metallic-composite joint fitting, comprising:
a frustoconical internal bearing;
an internal bolt coupled within a bore of the frustoconical internal bearing;
a metallic end fitting coupled to the internal bolt, wherein the metallic end fitting comprises a bearing portion disposed within the bore;
a conical sleeve disposed about the frustoconical internal bearing; and
an external nut coupled to the metallic end fitting and the conical sleeve,
wherein the conical sleeve comprises a flanged portion coupled to the frustoconical internal bearing.

12. The landing gear system of claim 11, wherein a composite structure is coupled between the frustoconical internal bearing and the conical sleeve.

13. The landing gear system of claim 12, wherein the composite structure comprises a cylindrical portion and a conical end portion.

14. The landing gear system of claim 13, wherein the conical end portion is coupled relatively between the frustoconical internal bearing at a first conical bearing surface and the conical sleeve at a second conical bearing surface.

15. The landing gear system of claim 14, wherein the conical end portion is flared.

16. The landing gear system of claim 11, wherein the bearing portion contacts the frustoconical internal bearing at a cylindrical bearing surface.

17. The landing gear system of claim 11, wherein the internal bolt is integral to the frustoconical internal bearing.

18. The landing gear system of claim 11, wherein the metallic end fitting is coupled to the internal bolt at an internally threaded surface of the metallic end fitting.

19. The landing gear system of claim 11, wherein the flanged portion of the conical sleeve is coupled to the frustoconical internal bearing via a locking ring.

20. A method of joining a composite structure and a metallic end fitting, comprising:
coupling an internal bolt within a bore of a frustoconical internal bearing;
wrapping the composite structure over the frustoconical internal bearing to form a conical end portion;
disposing a conical sleeve over the conical end portion to enclose the conical end portion between a first conical bearing surface and a second conical bearing surface and coupling a flanged portion of the conical sleeve to the frustoconical internal bearing;
inserting a bearing portion of the metallic end fitting into the bore of the frustoconical internal bearing and coupling the internal bolt to an internally threaded surface of the metallic end fitting; and
coupling an external nut to an externally threaded surface of the metallic end fitting and contacting the external nut with the flanged portion of the conical sleeve.

* * * * *